United States Patent
Takahashi et al.

(10) Patent No.: US 10,919,584 B2
(45) Date of Patent: Feb. 16, 2021

(54) WORK VEHICLE

(71) Applicant: TADANO LTD., Kagawa (JP)

(72) Inventors: Masafumi Takahashi, Kagawa (JP); Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 0 days.

(21) Appl. No.: 16/754,546

(22) PCT Filed: Oct. 2, 2018

(86) PCT No.: PCT/JP2018/036831
§ 371 (c)(1),
(2) Date: Apr. 8, 2020

(87) PCT Pub. No.: WO2019/077993
PCT Pub. Date: Apr. 25, 2019

(65) Prior Publication Data
US 2020/0354001 A1   Nov. 12, 2020

(30) Foreign Application Priority Data

Oct. 17, 2017 (JP) ................. 2017-200982
Oct. 17, 2017 (JP) ................. 2017-200984

(51) Int. Cl.
*H04N 7/18* (2006.01)
*B62D 49/06* (2006.01)
*B66C 13/00* (2006.01)

(52) U.S. Cl.
CPC .......... *B62D 49/0614* (2013.01); *B66C 13/00* (2013.01); *H04N 7/18* (2013.01)

(58) Field of Classification Search
CPC ....... B62D 49/0614; B66C 13/00; H04N 7/18
(Continued)

(56) References Cited

U.S. PATENT DOCUMENTS

| 2013/0182066 A1 | 7/2013 | Ishimoto |
| 2014/0118533 A1 | 5/2014 | Chang |

(Continued)

FOREIGN PATENT DOCUMENTS

| CN | 101096262 A | 1/2008 |
| CN | 103141090 A | 6/2013 |

(Continued)

OTHER PUBLICATIONS

International Search Report issued in PCT Patent Application No. PCT/JP2018/036831 dated Dec. 25, 2018.

(Continued)

*Primary Examiner* — Robert Chevalier
(74) *Attorney, Agent, or Firm* — Marshall, Gerstein & Borun LLP

(57) ABSTRACT

A first controller of a work vehicle executes a first composition process for composition of a first video imaged by a camera and a second video imaged by a camera and generating composite video data indicating a composite video, and a transmission process for transmitting, to a second controller, the composite video data generated in the first composition process. The second controller of the work vehicle executes a reception process for receiving the composite video data from the first controller, and a display process for displaying the composite video indicated by the composite video data received in the reception process on a display.

15 Claims, 9 Drawing Sheets

(58) Field of Classification Search
USPC .................. 348/144, 143, 148, 149, 153
See application file for complete search history.

(56) References Cited

U.S. PATENT DOCUMENTS

| | | | |
|---|---|---|---|
| 2016/0217331 A1 | 7/2016 | Kowatari et al. | |
| 2017/0016210 A1 | 1/2017 | Kowatari et al. | |
| 2017/0284069 A1 | 10/2017 | Machida et al. | |
| 2018/0044893 A1 | 2/2018 | Machida et al. | |
| 2018/0080198 A1 | 3/2018 | Machida et al. | |
| 2018/0134527 A1 | 5/2018 | Oishi | |
| 2019/0387153 A1* | 12/2019 | De Mers | H04N 5/23216 |
| 2020/0229137 A1* | 7/2020 | Rubin | G08G 1/052 |

FOREIGN PATENT DOCUMENTS

| | | |
|---|---|---|
| EP | 3001522 A1 | 3/2016 |
| JP | 2011-151742 A | 8/2011 |
| JP | 2013-142037 A | 7/2013 |
| JP | 2013253402 A | 12/2013 |
| JP | 2015-139158 A | 7/2015 |
| JP | 2016030891 A | 3/2016 |
| JP | 2016194237 A | 11/2016 |
| JP | 2017047999 A | 3/2017 |
| JP | 2017061382 A | 3/2017 |
| WO | WO-2015/122245 A1 | 8/2015 |
| WO | WO-2016/158265 A1 | 10/2016 |
| WO | WO-2016174754 A1 | 11/2016 |

OTHER PUBLICATIONS

Office Action issued in Chinese Patent Application No. 201880055801.4 dated Sep. 30, 2020.

Supplementary European Search Report issued in European Patent Application No. 18868136 dated Nov. 18, 2020.

* cited by examiner

WORK VEHICLE

TECHNICAL FIELD

The present invention relates to a self-propelled work vehicle.

BACKGROUND

In a work vehicle which is generally called a rough terrain crane or the like, an operation unit for causing a travel body to travel and an operation unit that runs a rotating body and a boom are disposed in the same cabin. The work vehicle has a large size, and thus an operator is likely to have a blind spot. In addition, it is not easy for the operator in the cabin to know a situation around the work vehicle.

For example, in the work vehicle disclosed in Japanese Unexamined Patent Application, Publication No. 2013-253402, a plurality of cameras image videos around the work vehicle, and the videos are displayed on a display in the cabin. Consequently, the operator who occupies the cabin can appropriately know the situation around the work vehicle. In the work vehicle, a rotating body which supports the cabin rotates on a travel body. Therefore, in order for the videos imaged by the cameras mounted in the travel body to be displayed in the cabin, it is important to employ a suitable method for transmitting video data. For example, Japanese Unexamined Patent Application, Publication No. 2017-61382 discloses a crane truck in which image data obtained from imaging performed by a camera installed on a travel body is wirelessly transmitted to a rotating body.

In the work vehicle disclosed in Japanese Unexamined Patent Application, Publication No. 2013-253402, particularly when the plurality of cameras are mounted in the travel body, cabling of communication cables, synchronization of a plurality of items of video data, or the like need to be considered, for example. That is, of limited communication cables, a cable via which the video data is transmitted can be allocated; however, in this case, there is a concern that a communication cable which is allocated for vehicle control is likely to be restricted. However, a dedicated cable for the video data is also considered to be provided, but it is not possible to provide the dedicated cable in terms of layout space or costs of cables.

Wireless communication has a problem of a delay greater than wired communication has. Therefore, when items of video data acquired by the plurality of cameras mounted in the travel body are individually transmitted, for example, some items of video data will be subjected to a transmission delay, and thus there is a possibility that it is not possible to display a plurality of videos imaged at the same time point on a display.

The present invention is made with consideration for such circumferences, a first object thereof is to provide a technology for appropriately transmitting video data between a travel body and a work body in a work vehicle that displays, in a cabin provided in the work body, videos imaged by a plurality of cameras mounted in the travel body, and a second object thereof is to provide a technology for displaying, in a cabin, videos imaged at the same time point by cameras in a work vehicle that wirelessly transmits the video data to the work body.

SUMMARY OF INVENTION

In order to achieve the first object, a work vehicle according to the present invention includes: a travel body; a work body rotatably supported by the travel body; a cabin supported by the work body; a first camera and a second camera mounted in the travel body; an operation unit that is disposed in an interior space of the cabin, causes the travel body to travel, and receives an operation of an operator for running the work body; a display disposed in the interior space of the cabin; a first controller mounted in the travel body; and a second controller mounted in the work body. The first controller executes a first composition process for composition of a first video imaged by the first camera and a second video imaged by the second camera and generating composite video data indicating a composite video, and a transmission process for transmitting, to the second controller, the composite video data generated in the first composition process. The second controller executes a reception process for receiving the composite video data from the first controller, and a display process for displaying, on the display, the composite video indicated by the composite video data received in the reception process.

In this configuration, since the items of composite video data obtained by composition of the videos imaged by the plurality of cameras are transmitted between the travel body and the work body, the following effects can be expected, for example, compared to a case where the plurality of items of video data are individually transmitted. As an example, in a case where the video data is transmitted via cables, the number of communication cables which are added to a slip ring provided between the travel body and the work body is reduced. As another example, in a case of wireless transmission of the video data, the plurality of items of video data can be reliably synchronized.

As an example, the first video and the second video are obtained by arranging a plurality of images in an imaging order. The first controller generates the composite video obtained by arranging a plurality of composite images in an imaging order in the first composition process, the plurality of composite images being obtained by composition of the images corresponding to both the first video and the second video.

As another example, the first video and the second video are obtained by arranging a plurality of images in an imaging order. The first controller generates the composite video obtained by alternately arranging the images contained in the first video and the images contained in the second video in the first composition process.

Preferably, the first camera is mounted in the travel body, toward a front side of the travel body. The second camera is mounted in the travel body, toward a rear side of the travel body.

More preferably, the work vehicle further includes: a third camera mounted in the work body, toward a right-hand side of the work body, and a fourth camera mounted in the work body, toward a left-hand side of the work body. The second controller executes a second composition process for further composition of a third video imaged by the third camera and a fourth video imaged by the fourth camera, with the composite video indicated by the composite video data received in the reception process, and displaying of the composite video on the display in the display process, the composite video being obtained by composition of the third video and the fourth video in the second composition process.

More preferably, the second controller generates the composite video showing a situation around the work vehicle in a bird's-eye view from above in the second composition process by using the first video, the second video, the third video, and the fourth video.

In this configuration, the operator who occupies the cabin can appropriately know a situation around the work vehicle, can cause the travel body to travel, and can run the work body.

As an example, the first controller and the second controller are connected via a communication cable passing through a slip ring provided between the travel body and the work body. The first controller transmits the composite video data to the second controller via the communication cable in the transmission process. The second controller receives the composite video data from the first controller via the communication cable in the reception process.

As another example, the first controller has a first wireless communication unit. The second controller has a second wireless communication unit. The first controller wirelessly transmits the composite video data to the second controller via the first wireless communication unit in the transmission process. The second controller wirelessly receives the composite video data from the first controller via the second wireless communication unit in the reception process.

In order to achieve the second object, a work vehicle according to the present invention includes: a travel body; a work body rotatably supported by the travel body; a cabin supported by the work body; a first camera and a second camera mounted in the travel body; an operation unit that is disposed in an interior space of the cabin, causes the travel body to travel, and receives an operation of an operator for running the work body; a display disposed in the interior space of the cabin; a first controller that is mounted in the travel body and has a first wireless communication unit; and a second controller that is mounted in the work body and has a second wireless communication unit. The first controller executes a transmission process for synchronizing first video data obtained from imaging performed by the first camera with second video data obtained from imaging performed by the second camera and wirelessly transmitting the synchronized first and second video data to the second controller via the first wireless communication unit. The second controller executes a reception process for wirelessly receiving the synchronized first and second video data from the first controller via the second wireless communication unit, and a display process for collectively displaying, on the display, videos indicated by the first video data and the second video data received in the reception process.

In this configuration, since the first video data and the second video data are synchronized and then wirelessly transmitted from the first controller to the second controller, videos imaged by the cameras at the same time point are displayed in the cabin. Furthermore, a video signal is transmitted without a communication cable or the like and thus is not influenced by noise.

As an example, the first controller executes a first composition process for generating composite video data indicating a composite video obtained by composition of the first video and the second video, and wireless transmission of the composite video data generated in the first composition process to the second controller via the first wireless communication unit in the transmission process.

As another example, the first video and the second video are obtained by arranging a plurality of images in an imaging order. The first controller executes an adding process for adding a timestamp indicating an imaging time point for each corresponding image of the plurality of images contained in the first video and the second video, and wireless transmission of the first video data and the second video data, to which the timestamp has been added in the adding process, to the second controller via the first wireless transmission unit in the transmission process.

Preferably, the first camera is mounted in the travel body, toward a front side of the travel body, and the second camera is mounted in the travel body, toward a rear side of the travel body.

More preferably, the work vehicle further includes: a third camera mounted in the work body, toward a right-hand side of the work body, and a fourth camera mounted in the work body, toward a left-hand side of the work body. The second controller executes a second composition process for composition of a third video imaged by the third camera and a fourth video imaged by the fourth camera with the first video and the second video and generating a composite video, and displaying of the composite video generated in the second composition process on the display in the display process.

More preferably, the second controller generates the second composite video showing a situation around the work vehicle in a bird's-eye view from above in the second composition process, by using the first video, the second video, the third video, and the fourth video.

In this configuration, the operator who occupies the cabin can appropriately know the situation around the work vehicle, can cause the travel body to travel, and can run the work body.

For example, the first wireless communication unit and the second wireless communication unit perform wireless communication in a procedure in accordance with Wi-Fi (registered trademark), Bluetooth (registered trademark), or wireless HDMI (registered trademark).

According to the present invention, since composite video data obtained by composition of the videos imaged by the plurality of cameras is transmitted between the travel body and the work body, the number of communication cables which are added to a slip ring can be reduced, or the plurality of items of video data can be reliably synchronized. As a result, signals of videos imaged by the plurality of cameras are inhibited from interfering with each other, and thus an image quality improves.

According to the present invention, since first video data and second video data are synchronized and then wirelessly transmitted from the first controller to the second controller, the videos imaged by the cameras at the same time point can be displayed in the cabin.

DESCRIPTION OF EMBODIMENTS

Hereinafter, a preferred embodiment of the present invention will be appropriately described with reference to the drawings. Incidentally, the embodiment is described only as an example of the present invention, and thus it is needless to say that the embodiment may be modified within a range without changing the gist of the present invention. The following embodiment and modification examples can be combined in any combination.

[Rough Terrain Crane 10]

Figure 1:
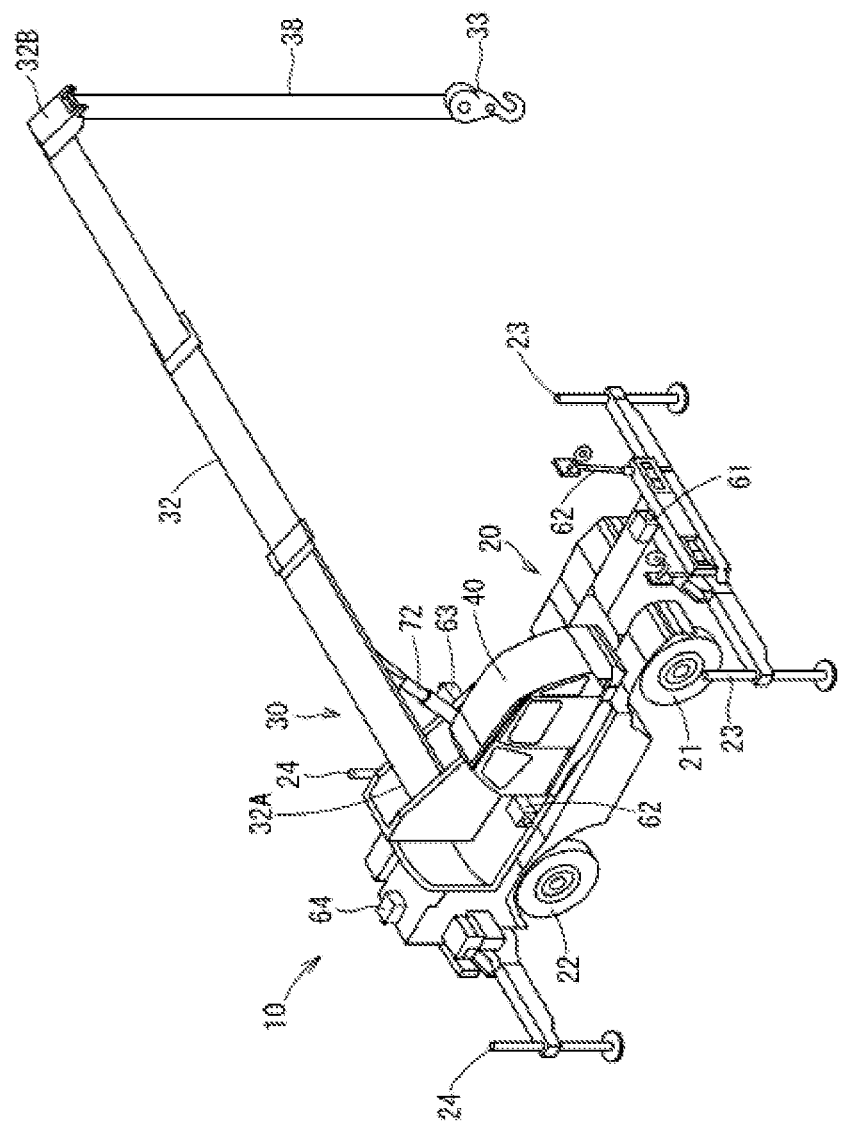
FIG. 1 is a perspective view of a rough terrain crane 10 according to an embodiment.
Figure 2:
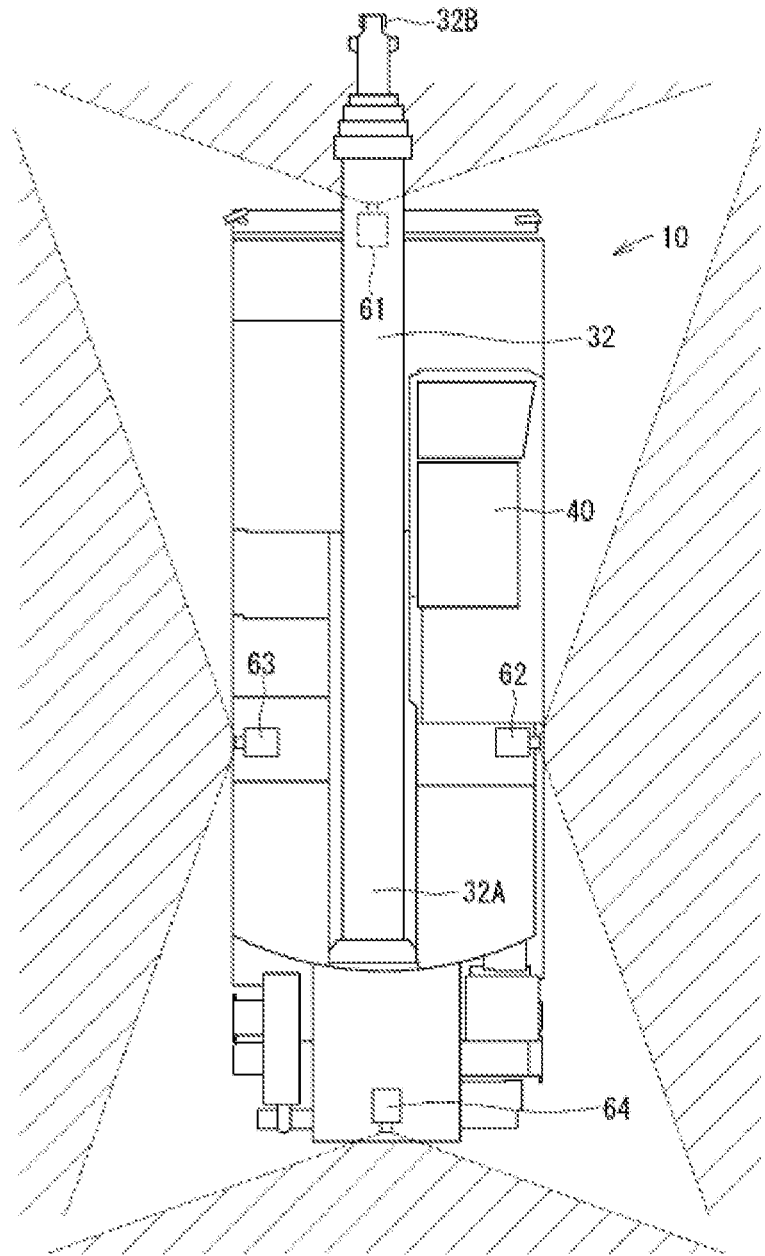
FIG. 2 is a plan view of the rough terrain crane 10 according to the embodiment.

As illustrated in FIGS. 1 and 2, a rough terrain crane 10 according to the embodiment mainly includes a lower travel body 20 and an upper slewing body 30. The rough terrain crane 10 travels to a destination by the lower travel body 20 and runs the upper slewing body 30 in a predetermined manner to the destination. The rough terrain crane 10 is an example of a work vehicle.

[Lower Travel Body 20]

The lower travel body 20 includes a pair of right and left front wheels 21 and a pair of right and left rear wheels 22. The front wheels 21 are steering wheels and are steered by steering 42B to be described below. The rear wheels 22 are driving wheels and are rotated by a drive force of an engine (not illustrated), the drive force being transmitted via a transmission (not illustrated).

The lower travel body 20 includes outriggers 23 and 24. The outrigger 23 is disposed at a front end of the lower travel body 20, and the outrigger 24 is disposed at a rear end of the lower travel body 20. The outriggers 23 and 24 can have a change between an outrigging state of being in contact with the ground at a position at which the outriggers project out from the lower travel body 20 and a retracting state of retracting into the lower travel body 20 in a state where the outriggers are separated from the ground. The outriggers 23 and 24 come into the outrigging state when the upper slewing body 30 is run, and thereby a posture of the rough terrain crane 10 is stabilized. On the other hand, the outriggers 23 and 24 come into the retracting state when the lower travel body 20 travels.

[Upper Slewing Body 30]

The upper slewing body 30 is rotatably supported by the lower travel body 20 via a rotating bearing (not illustrated). The upper rotating body 30 rotates by a drive force of a rotating motor 71 (refer to FIG. 4) which is transmitted thereto. For example, a rotating angle of the upper slewing body 30 indicates an angle in a clockwise direction when an angle in a forward direction of the lower travel body 20 is set to 0°. The upper slewing body 30 mainly includes a telescopic boom 32, a hook 33, and a cabin 40. The upper slewing body 30, the telescopic boom 32, and the hook 33 are examples of a work body.

A derricking cylinder 72 (refer to FIGS. 2 and 4) causes the telescopic boom 32 to perform derricking movement, and a telescopic cylinder 73 (refer to FIG. 4) causes the telescopic boom to be telescopic. A proximal end 32A of the telescopic boom 32 is supported by the upper slewing body 30, between the front end and the rear end of the lower travel body 20. As illustrated in FIG. 2, in a state where the telescopic boom 32 is most lowered and has the shortest length, a distal end 32B of the telescopic boom 32 is positioned at a front side from the front end of the lower travel body 20. Hereinafter, a state where the rotating angle of the upper slewing body 30 is 0°, the telescopic boom 32 is most lowered, and the telescopic boom 32 has the shortest length is referred to as a traveling posture of the rough terrain crane 10. In other words, in the traveling posture of the rough terrain crane 10, the telescopic boom 32 is extended more toward the front side from the front end of the lower travel body 20.

A jib (not illustrated) for extending a work radius and a work height may be detachably attached to the distal end 32B of the telescopic boom 32. The hook 33 is suspended by a wire 38 from the distal end 32B of the telescopic boom 32 or a distal end of the jib and thus is lifted and lowered by a winch 74 (refer to FIG. 4) which winds or unwinds the wire 38.

[Cabin 40]

Figure 3:
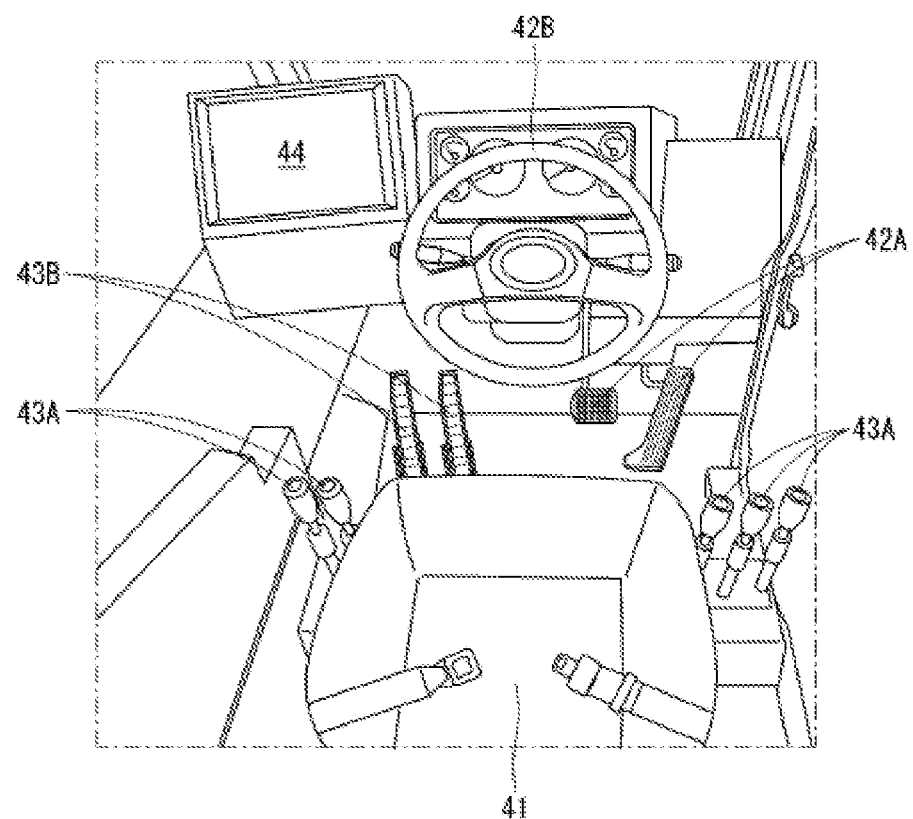
FIG. 3 is a layout view of configurational elements in a cabin 40.

The cabin 40 has a box shape with an interior space. An operator who operates the rough terrain crane 10 occupies the interior space. The cabin 40 is supported by the upper slewing body 30, at the rear side from the front end of the lower travel body 20 and the front side from the proximal end 32A of the telescopic boom 32. The cabin 40 is disposed adjacent to the telescopic boom 32 on the right. However, a positional relationship between the telescopic boom 32 and the cabin 40 is not limited to an example described above, and the cabin 40 may be disposed adjacent to the telescopic boom 32 on the left. As illustrated in FIG. 3, a seat 41, a first operation unit 42, a second operation unit 43, and a display 44 are accommodated in the interior space of the cabin 40.

The first operation unit 42 receives an instruction of the operator for causing the lower travel body 20 to travel. More specifically, the first operation unit 42 mainly includes a plurality of pedals 42A and the steering 42B. The pedals 42A receive an instruction for accelerating or decelerating the lower travel body 20, and examples of the pedal include an accelerator pedal, a brake pedal, or a clutch pedal. The steering 42B receives an operation indicating an instruction of a traveling direction of the lower travel body 20. The first operation unit 42 employs a well-known configuration, and thus the detailed description thereof is omitted.

The second operation unit 43 changes the state of the outriggers 23 and 24, rotates the upper slewing body 30, causes the telescopic boom 32 to be extended or retracted and to perform derricking movement, and receives an instruction for lifting or lowering the hook 33. For example, the second operation unit 43 is configured of a lever 43A, a pedal 43B, a switch (not illustrated), or the like. The second operation unit 43 employs a well-known configuration, and thus the detailed description thereof is omitted.

The display 44 is disposed at a left-hand position from a center in a right-left direction in the cabin 40. More specifically, the display 44 is disposed adjacent to the steering 42B on the left. The display 44 displays a state of the rough terrain crane 10. More specifically, the display 44 displays a speed of the lower travel body 20, states of the outriggers 23 and 24, a rotating angle of the upper slewing body 30, an extension length and a derrick angle of the telescopic boom 32, or the like. The display 44 displays a video imaged by cameras 61 to 64 to be described below.

The operator sitting on the seat 41 can operate the first operation unit 42 and the second operation unit 43 and can visually recognize information displayed on the display 44. More specifically, the operator can cause the lower travel body 20 to travel and can run the upper slewing body 30 and the telescopic boom 32, in a state of sitting on the seat 41. In the traveling posture of the rough terrain crane 10, an upper end of the telescopic boom 32 is positioned higher than a sight line of the operator sitting on the seat 41. In other words, the operator sitting on the seat 41 of the rough terrain crane 10 in the traveling posture has to cause the rough terrain crane 10, in a state where it is difficult to see right front of the lower travel body 20 and a left side of the lower travel body 20, to run.

[Cameras 61 to 64]

The cameras 61 to 64 image an object and generate video data. In other words, the cameras 61 to 64 generate the video data indicating videos (moving images). The cameras 61 to 64 are desirably wide-angle (for example, 80° to 240° cameras used to generate bird's-eye images. As illustrated in FIGS. 1 and 2, the cameras 61 to 64 are attached to respective portions of the rough terrain crane 10 and have different orientations from each other. Incidentally, in order to clarify positions and orientations of the cameras 61 to 64, the cameras 61 to 64 are drawn in a large size in FIGS. 1 and 2; however, it is desirable to use small-sized cameras.

The camera 61 is attached to the front end of the lower travel body 20 at the center in the right-left direction. The camera 61 is attached below the telescopic boom 32 which is most lowered. The camera 61 according to the embodiment is attached to a front bumper; however, a specific attachment position of the camera 61 is not limited thereto. The camera 61 is oriented toward a front side of the rough terrain crane 10. In other words, the camera 61 images the front side of the rough terrain crane 10 at a viewing angle of 80° to 240°. The camera 61 is an example of a first camera, and a video imaged by the camera 61 is an example of a first video.

The camera 62 is attached to a right-hand end of the upper slewing body 30. The camera 62 according to the embodiment is attached to a rear side of the cabin 40; however, a specific attachment position of the camera 62 is not limited thereto. The camera 62 is oriented toward a right-hand side of the rough terrain crane 10 in the traveling posture. In other words, the camera 62 images the right-hand side of the rough terrain crane 10 at a viewing angle of 80° to 240°. The camera 62 is an example of a third camera, and a video imaged by the camera 62 is an example of a third video.

The camera 63 is attached to a left-hand end of the upper slewing body 30. The camera 63 according to the embodiment is attached to the same position as that of the camera 62 in a front-rear direction; however, a specific attachment position of the camera 63 is not limited thereto. The camera 63 is oriented toward a left-hand side of the rough terrain crane 10 in the traveling posture. In other words, the camera 63 images the left-hand side of the rough terrain crane 10 at a viewing angle of 80° to 240°. The camera 63 is an example of a fourth camera, and a video imaged by the camera 63 is an example of a fourth video.

The camera 64 is attached to the rear end of the lower travel body 20 at the center in the right-left direction. For example, the camera 64 may be attached to a weight support that supports a counterweight (not illustrated). The camera 64 is oriented toward a rear side of the rough terrain crane 10. In other words, the camera 64 images the rear side of the rough terrain crane 10 at a viewing angle of 80° to 240°. The camera 64 is an example of a second camera, and a video imaged by the camera 64 is an example of a second video.

[First Controller 51 and Second Controller 53]

Figure 4:
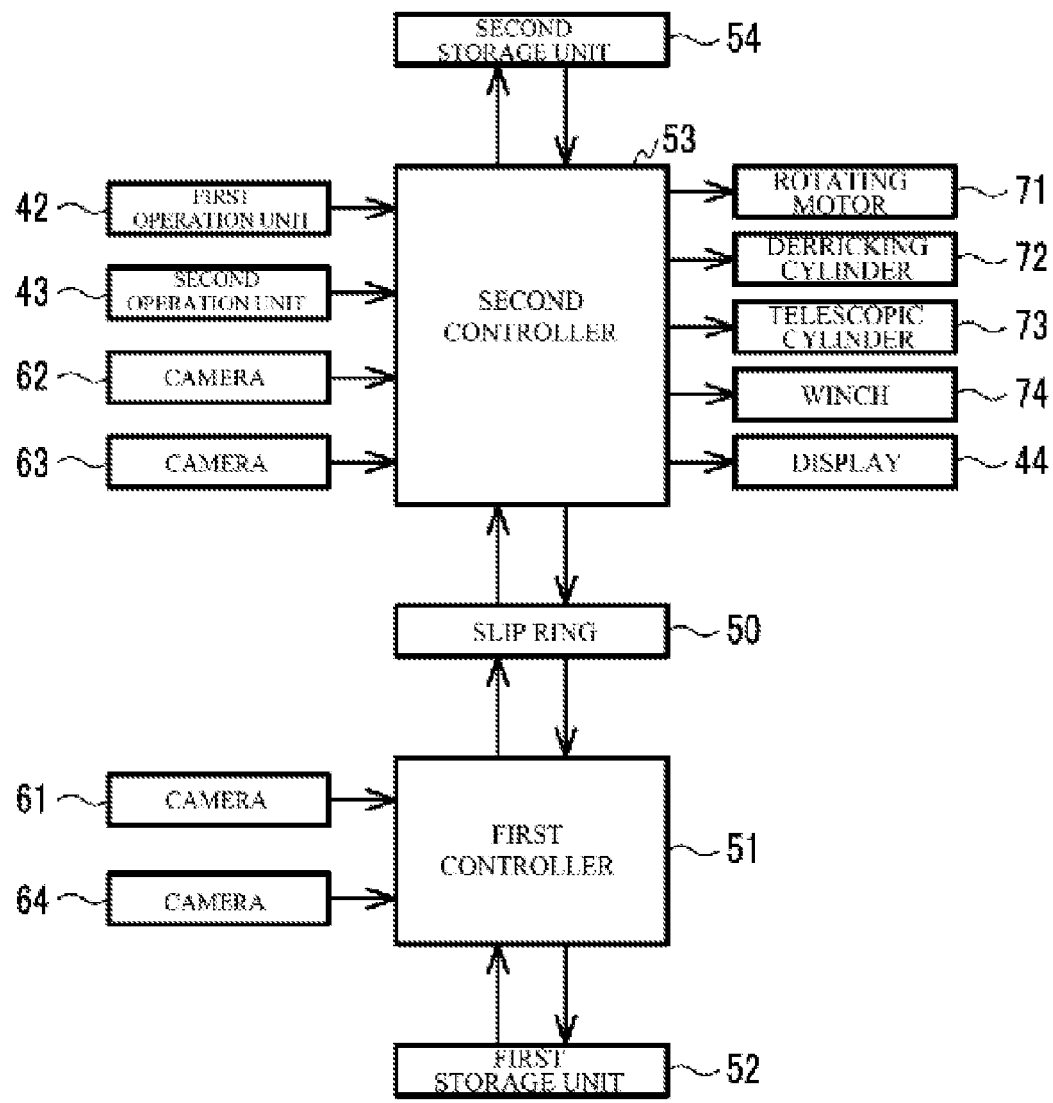
FIG. 4 is a block diagram of the rough terrain crane 10 according to the embodiment.

As illustrated in FIG. 4, the rough terrain crane 10 includes a first controller 51, a first storage unit 52, a second controller 53, and a second storage unit 54. The first controller 51 and the first storage unit 52 are provided in the lower travel body 20. The second controller 53 and the second storage unit 54 are provided in the upper slewing body 30. The first controller 51 and the second controller 53 are connected to each other via a plurality of communication cables (not illustrated) passing through a slip ring 50.

The first controller 51 and the second controller 53 control the running of the rough terrain crane 10. The first controller 51 and the second controller 53 may be realized by a central processing unit (CPU) that executes a program stored in the first storage unit 52 and the second storage unit 54, may be realized by a hardware circuit, or may be realized by a combination thereof. The first storage unit 52 and the second storage unit 54 store the program which is executed by the CPU and various items of information which are temporarily stored during execution of the program.

The first controller 51 controls operations of the cameras 61 and 64. In other words, the first controller 51 causes the cameras 61 and 64 to start imaging and acquires first video data (hereinafter, referred to as "video data F") and second video data (hereinafter, referred to as "video data B") generated by the cameras 61 and 64. The first controller 51 performs composition of the video data B and F acquired by the cameras 61 and 64 to generate first composite video data and transmits the generated first composite video data to the second controller 53 via the communication cable passing through the slip ring 50. A process for generating the first composite video data is described in detail below.

The second controller 53 receives the first composite data from the first controller 51 via the communication cable passing through the slip ring 50. The second controller 53 controls operations of the cameras 62 and 63. In other words, the second controller 53 causes the cameras 62 and 63 to start imaging and acquires third video data (hereinafter, referred to as "video data R") and fourth video data (hereinafter, referred to as "video data L") generated by the cameras 62 and 63. The second controller 53 performs composition of the first composite data, the video data R, and the video data L to generate second composite video data and displays a second composite video indicated by the second composite video data, on a display 44. A process for generating the second composite video data is described in detail below.

The second controller 53 acquires operation signals which are output from the first operation unit 42 and the second operation unit 43. The second controller 53 controls a direction and a flow rate of operating oil to be supplied in response to the operation signal which is output from the second operation unit 43, thereby actuating an actuator such as the rotating motor 71, the derricking cylinder 72, the telescopic cylinder 73, or the winch 74. However, the actuator of the present invention is not limited to a hydraulic actuator and may be an electric actuator. Although not illustrated, the second controller 53 changes a steering angle of the front wheels 21, controls a rotational speed of an engine, and actuates a brake (not illustrated), in response to the operation signal which is output from the first operation unit 42.

The second controller 53 acquires detection signals which are output from a rotating-angle sensor (not illustrated) that detects a rotating angle of the upper slewing body 30, a derrick-angle sensor (not illustrated) that detects a derrick angle of the telescopic boom 32, a length sensor that detects a telescopic length of the telescopic boom 32, and a wire sensor that detects an unwinding length of the wire 38 by the winch 74. The second controller 53 determines the rotating angle of the upper slewing body 30, the derrick angle of the telescopic boom 32, the telescopic length of the telescopic boom 32, and the unwinding length of the wire 38, based on the detection signals acquired by the various sensors.

Figure 5:
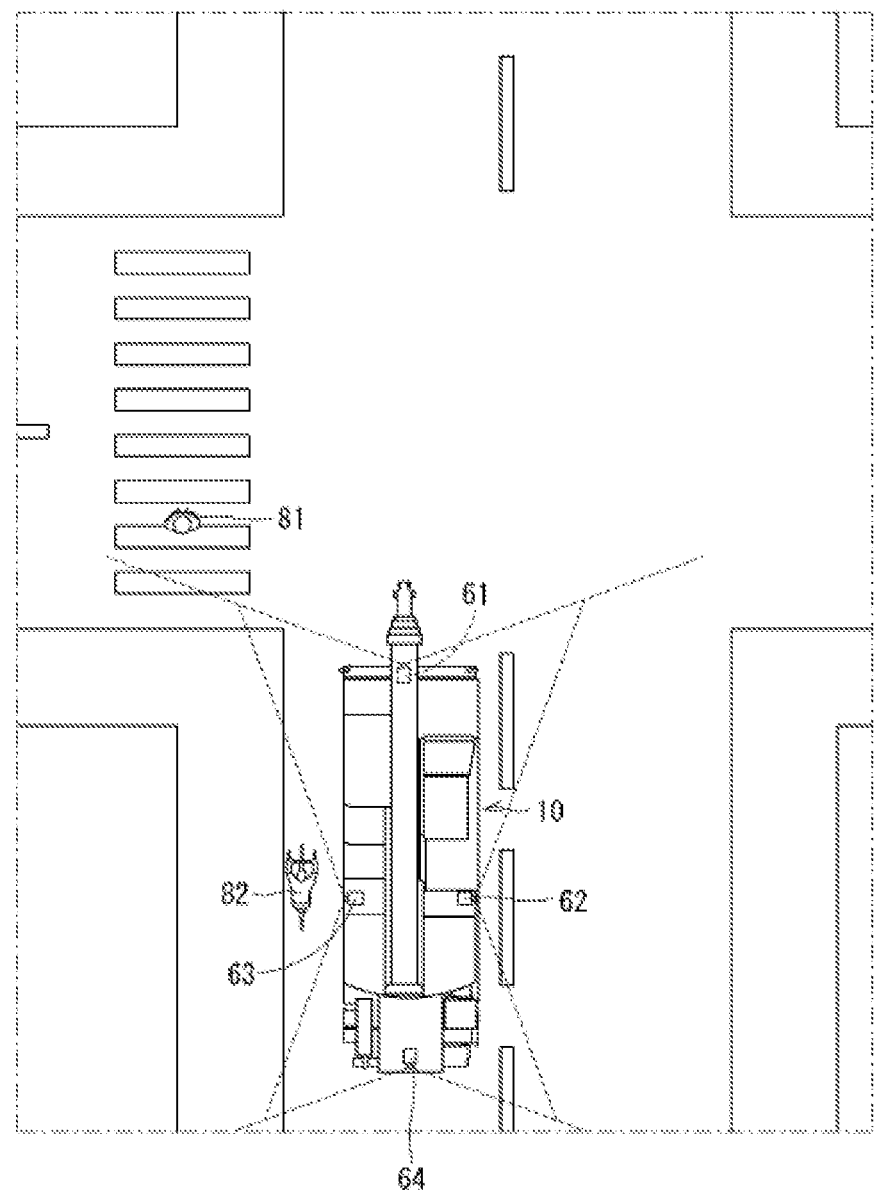
FIG. 5 is a plan view of the rough terrain crane 10 which approaches an intersection point.

FIG. 5 is a plan view illustrating a state where the rough terrain crane 10 approaches an intersection point. Around the rough terrain crane 10 in FIG. 5, there are a human 81 who is crossing a crosswalk at a front left side and a bicycle 82 running alongside at a left-hand side. However, the operator occupying the cabin 40 of the rough terrain crane 10 in FIG. 5 is not possible to visually recognize the human 81 and the bicycle 82 due to interference of the telescopic boom 32.

Figure 6:
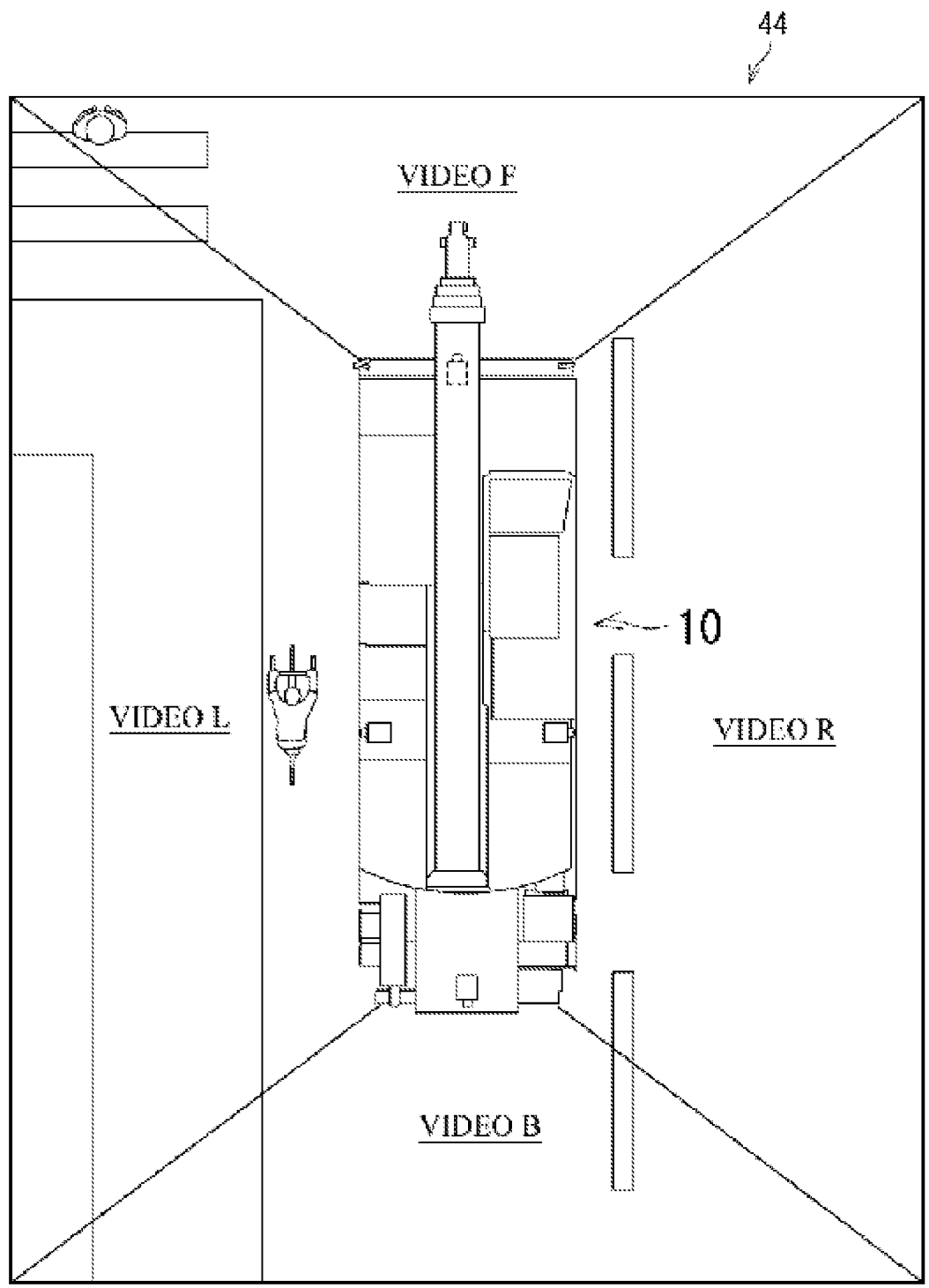
FIG. 6 is a display example on a display 44 of the rough terrain crane 10 in FIG. 5.

FIG. 6 is a video displayed on the display 44 of the rough terrain crane 10 in FIG. 5. The video illustrated in FIG. 5 is obtained by composition of videos imaged by the cameras 61 to 64. More specifically, the video illustrated in FIG. 5 is a bird's-eye video obtained by composition of videos showing a situation in a bird's-eye view from above around the rough terrain crane 10. Hereinafter, operations of the first controller 51 and the second controller 53 for displaying the video illustrated in FIG. 5 on the display 44 will be described with reference to FIG. 7.

The first controller 51 and the second controller 53 cause the cameras 61 to 64 to start imaging simultaneously. For example, the second controller 53 instructs a start of imaging to the cameras 61 and 64 through the first controller 51 and instructs an imaging start to the cameras 62 and 63 according to reception of an instruction for displaying the video on the display 44 through the second operation unit 43. However, a trigger of the imaging start of the cameras 61 to 64 is not limited to an example described above. For example, the imaging start may be performed at a timing at which the engine starts or may be at a timing when the outriggers 23 and 24 has a change in states of the retracting state and the outrigging state from one to the other state.

Figure 7:
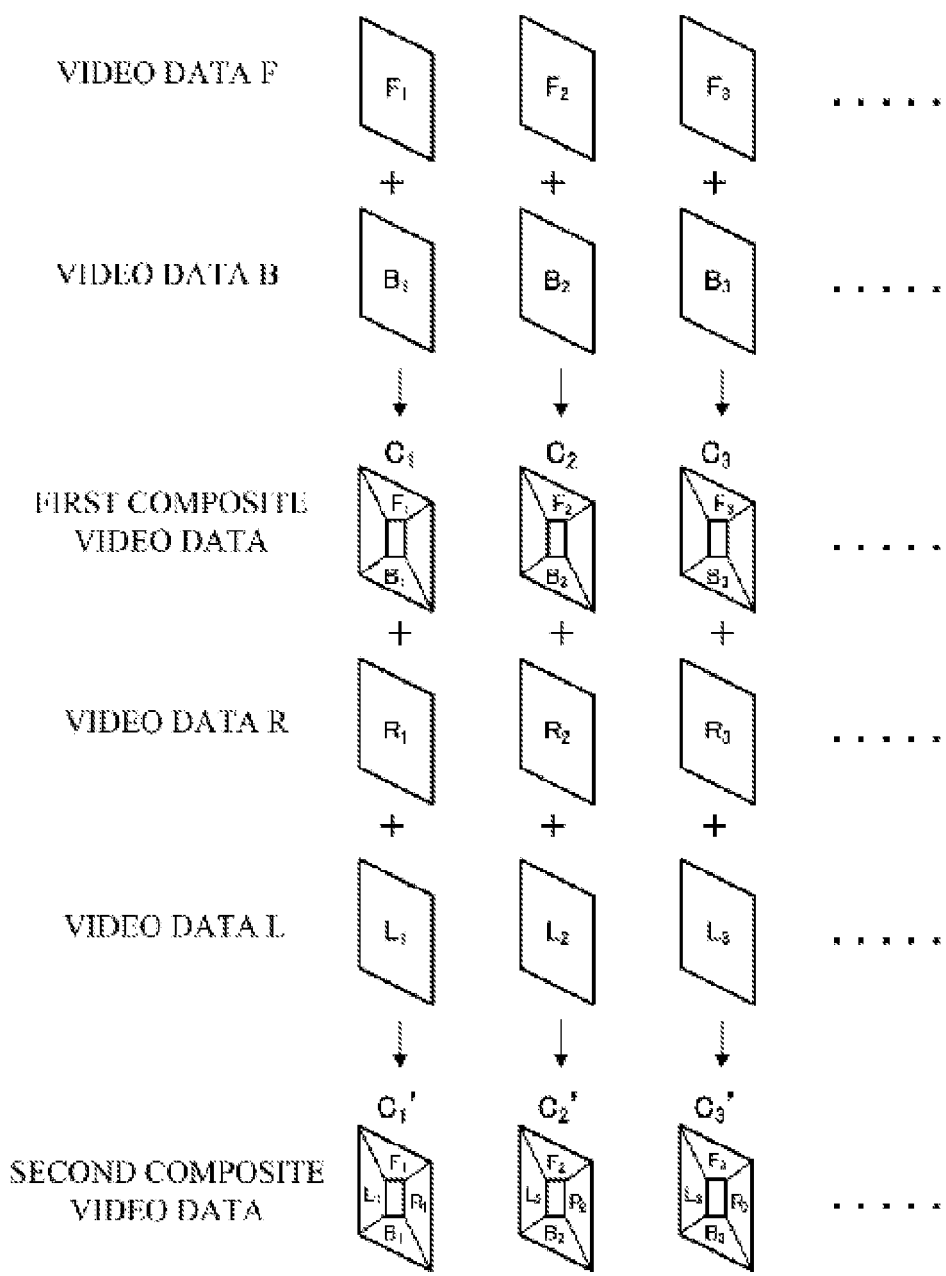
FIG. 7 is a diagram for illustrating an example of a method for composition of video data F, B, R, and L to generate second composite video data.
Figure 8:
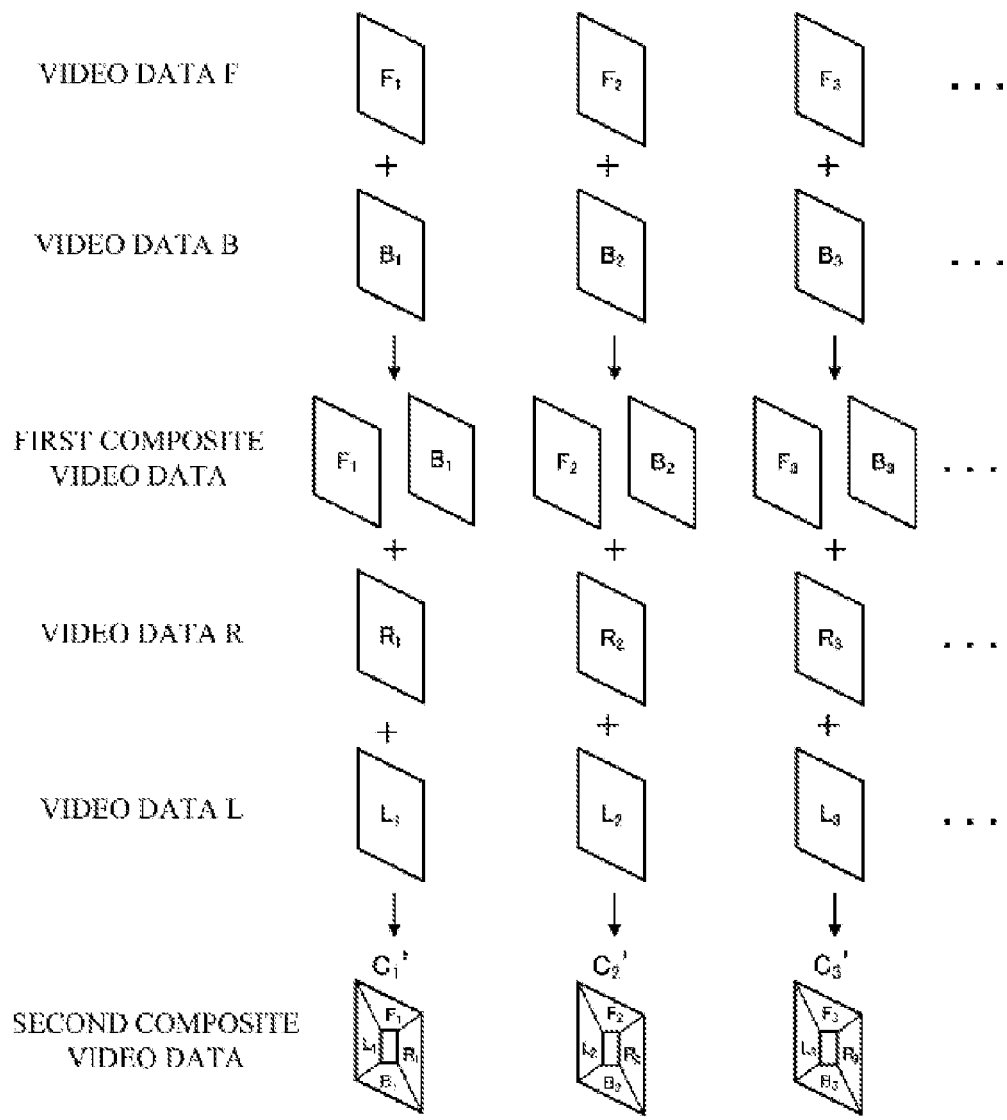
FIG. 8 is a diagram for illustrating another example of the method for composition of the video data F, B, R, and L to generate the second composite video data.

For example, as illustrated in FIGS. 7 and 8, the videos imaged by the cameras 61 to 64 are configured of a plurality of images (that is, still images) arranged in an imaging order. The cameras 61 to 64 output, to the first controller 51 and the second controller 53, video data containing a plurality of images captured at predetermined time intervals (for example, an interval of ⅟60 seconds). In other words, the first controller 51 acquires, from the camera 61, the video data F containing a plurality of images $F_1$, $F_2$, $F_3$, . . . arranged in an imaging order and acquires, from the camera 64, the video data B containing a plurality of images $B_1$, $B_2$, $B_3$, . . . arranged in an imaging order. The second controller 53 acquires, from the camera 62, the video data R containing a plurality of images $R_1$, $R_2$, $R_3$, . . . arranged in an imaging order and acquires, from the camera 63, the video data L containing a plurality of images $L_1$, $L_2$, $L_3$, . . . arranged in an imaging order.

The first controller 51 performs composition of a video indicated by the video data F and a video indicated by the video data B so as to generate the first composite video data indicating a first composite video. More specifically, the first controller 51 performs composition of images corresponding to the video data F and B to generate a composite image and arranges a plurality of generated composite images in an imaging order to generate the first composite video data. For example, the corresponding image indicates images obtained at the same turn in the imaging order, images captured at the same time point, or the like of the plurality of images contained in the respective video data F and B. A process for generating the first composite video data is an example of a first composition process. The composite image which is generated in the first composition process is a bird's-eye image of the front side and the rear side of the rough terrain crane 10 in a bird's-eye view from above. An algorithm for generating the bird's-eye image is already known, and thus the detailed description thereof is omitted; however, the following method is considered.

The first controller 51 executes a correction process for correcting a distortion due to a lens by multiplying a coefficient based on a lens distortion coefficient, an aspect ratio, or the like to coordinate values of pixels of images $F_1$ and $B_1$. The first controller 51 executes a bird's-eye view process for converting into images (individual bird's-eye images) in a view looking down from a virtual observing point set above the rough terrain crane 10 by multiplying various coefficients based on a camera attaching angle or the like to coordinate values of the pixels of the images F1 and $B_1$. The first controller 51 displays a crane image imitating a shape of the rough terrain crane 10 at the center, displays the image $F_1$ converted in the bird's-eye view process above the crane image, displays the image $B_1$ converted in the bird's-eye view process below the crane image, and generates a composite image $C_1$ obtained by composition of the images $F_1$ and $B_1$. The same is true of methods for generating composite images $C_2$ and $C_3$.

The first controller 51 transmits the first composite video data generated in the first composition process to the second controller 53 via the communication cable passing through the slip ring 50. This process is an example of a transmission process. The second controller 53 receives the first composite video data from the first controller 51 via the communication cable. This process is an example of a reception process. The second controller 53 performs composition of a video indicated by the first composite video data, a video indicated by the video data R, and a video indicated by the video data L so as to generate the second composite video data indicating a second composite video. This process is an example of a second composition process. Hereinafter, the detailed description of the same point between the first composition process and the second composition process is omitted, and differences are mainly described.

The second controller 53 performs composition of images corresponding to the first composite video data and the video data R and L to generate a composite image and arranges a plurality of generated composite images in an imaging order to generate the second composite video data. In other words, the second controller 53 executes the correction process and the bird's-eye view process on images $R_1$ and $L_1$. The second controller 53 displays the image $R_1$ converted in the bird's-eye view process at a right-hand side from the crane image of the composite image $C_1$ and displays the image $L_1$ converted in the bird's-eye view process at a left-hand side from the crane image of the composite image $C_1$ so as to generate a composite image $C_1'$ obtained by composition of the composite image $C_1$ and the images $R_1$ and $L_1$. The same is true of methods for generating composite images $C_2'$ and $C_3'$.

The second controller 53 displays, on the display 44, the second composite video containing the composite images $C_1'$, $C_2'$, $C_3'$, generated in the second composition process. This process is an example of a display process. The first composition process, the transmission process, the reception process, the second composition process, and the display process are executed in parallel with each other. In other words, the images captured by the cameras 61 to 64 are subjected to the composition in real time and are displayed on the display 44. Consequently, the operator can know the situation around the rough terrain crane 10 in real time, in the cabin 40.

Operations and Effects of Embodiment

According to the above-described embodiment, since the first composite video data obtained by composition of the videos imaged by the plurality of cameras 61 and 64 is wirelessly transmitted between the lower travel body 20 and the upper slewing body 30, the number of communication cables which are added to the slip ring 50 can be reduced, compared to a case where the plurality of items of video data F and B are individually transmitted via cables. Furthermore, the first composite video data is transmitted without a communication cable or the like and thus is not influenced by noise, and disturbance of a camera video is avoided. As a result, it is advantageous in that an image quality improves.

In the above-described embodiment, the videos imaged by the cameras 61 to 64 are converted into the bird's-eye images to be displayed on the display 44. Consequently, the operator who occupies the cabin 40 can appropriately know the situation around the rough terrain crane 10, can cause the lower travel body 20 to travel, can change the states of the outriggers 23 and 24, can rotate the upper slewing body 30, can cause the telescopic boom 32 to performing the derrick and telescopic movement, and can lift and lower the hook 33.

Modification Example 1

Incidentally, specific examples of the first composition process and the second composition process are not limited to the examples in FIG. 7. As an additional example, as illustrated in FIG. 8, the first controller 51 may generate composite videos $F_1$, $B_1$, $F_2$, $B_2$, $F_3$, $B_3$, . . . obtained by alternately arranging the images $F_1$, $F_2$, $F_3$, . . . contained in the video data F and the images $B_1$, $B_2$, $B_3$, . . . contained in the video data B. In other words, the first controller 51 may perform the composition of the plurality of videos spatially or may perform the composition of the plurality of videos temporarily in the first composition process. The second controller 53 may perform composition of the images $F_1$ and $B_1$ contained in the first composite video data, the image $R_1$ contained in the video data R, and the image $L_1$ contained in the video data L so as to generate the composite image $C_1'$.

Modification Example 2

Figure 9:
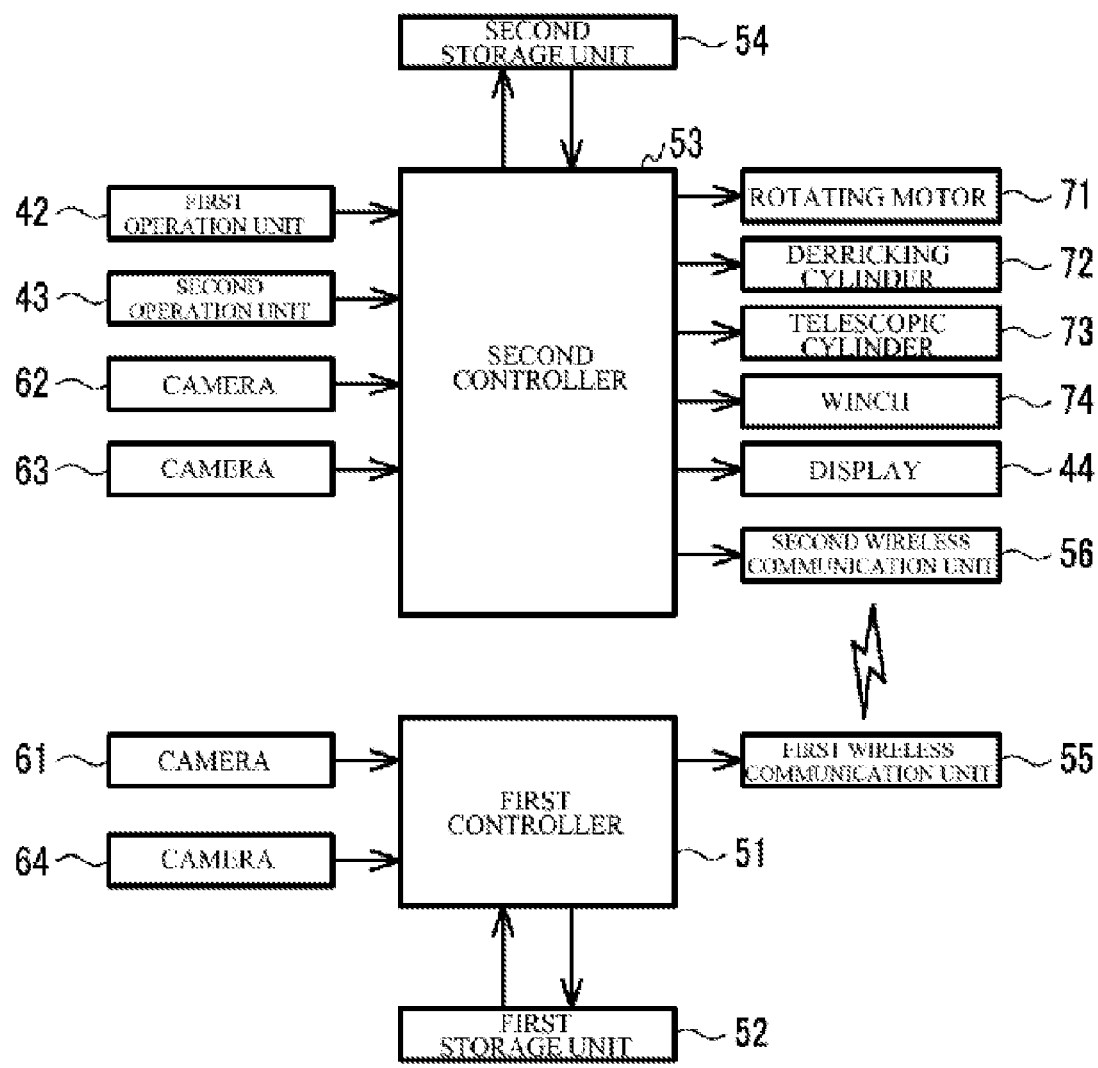
FIG. 9 is a block diagram of a rough terrain crane 10 according to Modification Example 2.

A communication route of the video data between the first controller 51 and the second controller 53 is not limited to the cable. As an additional example, as illustrated in FIG. 9, the first controller 51 may include a first wireless communication unit 55, and the second controller 53 may include a second wireless communication unit 56. For example, the first wireless communication unit 55 and the second wireless communication unit 56 are hardware including a conversion circuit that converts one of a wireless signal and the video data into the other in accordance with a predetermined wireless communication protocol and an antenna that transmits and receives a wireless signal converted in the conversion circuit. For example, as the wireless communication protocol, Wi-Fi (registered trademark), Bluetooth (registered trademark), wireless HDMI (registered trademark), or the like can be employed.

The first controller 51 may wirelessly transmit the first composite video data to the second controller 53 via the first wireless communication unit 55 in the transmission process. The second controller 53 may wirelessly receive the first composite video data from the first controller 51 via the second wireless communication unit 56 in the reception process. According to Modification Example 2, without adding a communication cable for the video data to the slip ring 50, the video data obtained by the cameras 61 and 64 attached to the lower travel body 20 can be transmitted to the upper slewing body 30.

According to Modification Example 2, since the first composite video data obtained by composition of the video data F and B is transmitted from the first controller 51 to the second controller 53, the plurality of items of video data F and B can be reliably synchronized. However, a specific method for synchronizing the video data F and B is not limited to the composition of the video data F and B.

As a further additional example, the first controller 51 may add a timestamp indicating an imaging time point to each of the images $F_1$, $F_2$, $F_3$, . . . contained in the video data F and may wirelessly transmit the video data F, to which the timestamp has been added, to the second controller 53 via the first wireless communication unit 55. Consequently, the timestamp is added to the image, and thus it is possible to determine whether a video is a real-time video. Similarly, the first controller 51 may add a timestamp indicating an imaging time point to each of the images $B_1$, $B_2$, $B_3$, . . . contained in the video data B and may wirelessly transmit the video data B, to which the timestamp has been added, to the second controller 53 via the first wireless communication unit 55. A process for adding the timestamp to the image is an example of an adding process.

The second controller 53 wirelessly receives the video data F and B, to which the timestamps have been added, from the first controller 51 via the second wireless communication unit 56. The second controller 53 adds a timestamp indicating an imaging time point to each of the images $R_1$, $R_2$, $R_3$, . . . contained in the video data R and adds a timestamp indicating an imaging time point to each of the images $L_1$, $L_2$, $L_3$, . . . contained in the video data L. The second controller 53 may perform composition of four images, to which the timestamps indicating the same time point have been added, of the plurality of images contained in the video data F, B, R, and L to generate the composite video and may display the generated composite video on the display 44.

Additional Modification Examples

The attachment positions and the number of cameras 61 to 64 are not limited to the above-described examples. As an example, the cameras 62 and 63 may be attached to the lower travel body 20. When the cameras 61 to 64 are attached to the lower travel body 20, the first controller 51 may perform composition of the video data F, B, R, and L or may synchronize the video data to transmit the video data to the second controller 53. The cameras 62 and 63 may be omitted. Further, an additional camera may be further attached to any position of the lower travel body 20 and the upper slewing body 30.

A video which is displayed on the display 44 is not limited to the bird's-eye video. In other words, the second controller 53 may divide the display 44 into a plurality of regions to display the videos imaged by the respective cameras 61 to 64 in the regions. In this case, the cameras 61 to 64 do not need to be a wide-angle camera and may be a camera having a standard viewing angle (for example, 25° to 50°. Attachment positions and the number of cameras 61 to 64 are not limited to the above-described examples; however, the cameras may focus on imaging the right front of the lower travel body 20, the left-hand side of the lower travel body 20, or the like, for example.

The invention claimed is:

1. A work vehicle comprising:
a travel body;
a work body rotatably supported by the travel body;
a cabin supported by the work body;
a first camera and a second camera mounted in the travel body;
an operation unit that is disposed in an interior space of the cabin, causes the travel body to travel, and receives an operation of an operator for running the work body;
a display disposed in the interior space of the cabin;
a first controller mounted in the travel body; and
a second controller mounted in the work body,
wherein the first controller executes
a first composition process for composition of a first video imaged by the first camera and a second video imaged by the second camera and generating composite video data indicating a composite video, and
a transmission process for transmitting, to the second controller, the composite video data generated in the first composition process, and
wherein the second controller executes
a reception process for receiving the composite video data from the first controller, and
a display process for displaying, on the display, the composite video indicated by the composite video data received in the reception process.

2. The work vehicle according to claim 1,
wherein the first video and the second video are obtained by arranging a plurality of images in an imaging order, and
wherein the first controller generates the composite video obtained by arranging a plurality of composite images in an imaging order in the first composition process, the plurality of composite images being obtained by composition of the images corresponding to both the first video and the second video.

3. The work vehicle according to claim 1,
wherein the first video and the second video are obtained by arranging a plurality of images in an imaging order, and
wherein the first controller generates the composite video obtained by alternately arranging the images contained in the first video and the images contained in the second video in the first composition process.

4. The work vehicle according to claim 1,
wherein the first camera is mounted in the travel body, toward a front side of the travel body, and
wherein the second camera is mounted in the travel body, toward a rear side of the travel body.

5. The work vehicle according to claim 4, further comprising:
a third camera mounted in the work body, toward a right-hand side of the work body, and
a fourth camera mounted in the work body, toward a left-hand side of the work body,
wherein the second controller executes
a second composition process for further composition of a third video imaged by the third camera and a fourth video imaged by the fourth camera, with the composite video indicated by the composite video data received in the reception process, and
displaying of the composite video on the display in the display process, the composite video being obtained by composition of the third video and the fourth video in the second composition process.

6. The work vehicle according to claim 5,
wherein the second controller generates the composite video showing a situation around the work vehicle in a bird's-eye view from above in the second composition process by using the first video, the second video, the third video, and the fourth video.

7. The work vehicle according to claim 1,
wherein the first controller and the second controller are connected via a communication cable passing through a slip ring provided between the travel body and the work body,
wherein the first controller transmits the composite video data to the second controller via the communication cable in the transmission process, and
wherein the second controller receives the composite video data from the first controller via the communication cable in the reception process.

8. The work vehicle according to claim 1,
wherein the first controller has a first wireless communication unit,
wherein the second controller has a second wireless communication unit,
wherein the first controller wirelessly transmits the composite video data to the second controller via the first wireless communication unit in the transmission process, and
wherein the second controller wirelessly receives the composite video data from the first controller via the second wireless communication unit in the reception process.

9. A work vehicle comprising:
a travel body;
a work body rotatably supported by the travel body;
a cabin supported by the work body;
a first camera and a second camera mounted in the travel body;
an operation unit that is disposed in an interior space of the cabin, causes the travel body to travel, and receives an operation of an operator for running the work body;
a display disposed in the interior space of the cabin;
a first controller that is mounted in the travel body and has a first wireless communication unit; and
a second controller that is mounted in the work body and has a second wireless communication unit,
wherein the first controller executes a transmission process for synchronizing first video data obtained from imaging performed by the first camera with second video data obtained from imaging performed by the second camera and wirelessly transmitting the synchronized first and second video data to the second controller via the first wireless communication unit, and
wherein the second controller executes
a reception process for wirelessly receiving the synchronized first and second video data from the first controller via the second wireless communication unit, and
a display process for collectively displaying, on the display, videos indicated by the first video data and the second video data received in the reception process.

10. The work vehicle according to claim 9,
wherein the first controller executes
a first composition process for generating composite video data indicating a composite video obtained by composition of the first video and the second video, and
wireless transmission of the composite video data generated in the first composition process to the second controller via the first wireless communication unit in the transmission process.

11. The work vehicle according to claim 9,
wherein the first video and the second video are obtained by arranging a plurality of images in an imaging order, and
wherein the first controller executes
an adding process for adding a timestamp indicating an imaging time point for each corresponding image of the plurality of images contained in the first video and the second video, and
wireless transmission of the first video data and the second video data, to which the timestamp has been added in the adding process, to the second controller via the first wireless transmission unit in the transmission process.

12. The work vehicle according to claim 9,
wherein the first camera is mounted in the travel body, toward a front side of the travel body, and
wherein the second camera is mounted in the travel body, toward a rear side of the travel body.

13. The work vehicle according to claim 12, further comprising:
a third camera mounted in the work body, toward a right-hand side of the work body, and
a fourth camera mounted in the work body, toward a left-hand side of the work body,
wherein the second controller executes
a second composition process for composition of a third video imaged by the third camera and a fourth video imaged by the fourth camera with the first video and the second video and generating a composite video, and
displaying of the composite video generated in the second composition process on the display in the display process.

14. The work vehicle according to claim 13,
wherein the second controller generates the second composite video showing a situation around the work vehicle in a bird's-eye view from above in the second composition process, by using the first video, the second video, the third video, and the fourth video.

15. The work vehicle according to claim 9,
wherein the first wireless communication unit and the second wireless communication unit perform wireless communication in a procedure in accordance with Wi-Fi (registered trademark), Bluetooth (registered trademark), or wireless HDMI (registered trademark).

* * * * *